June 6, 1933.  B. LARZELERE  1,913,204

METHOD OF MAKING BEARINGS

Filed Oct. 30, 1930

Inventor
Benton Larzelere
By Blackmore, Spencer & Flint
Attorneys

Patented June 6, 1933

1,913,204

UNITED STATES PATENT OFFICE

BENTON LARZELERE, OF FLINT, MICHIGAN, ASSIGNOR TO GENERAL MOTORS CORPORATION, OF DETROIT, MICHIGAN, A CORPORATION OF DELAWARE

METHOD OF MAKING BEARINGS

Application filed October 30, 1930. Serial No. 492,175.

A common method of making bearings, whether lined or unlined, consists in bending a strip of sheet metal, such as brass or steel, into the form of a cylinder, and then machining it to length on the exterior and interior. During these machining operations it is desirable that the ends of the strip shall not become displaced at the joint, either axially or radially, for this destroys the accuracy of the operation.

According to my invention the ends of the strip are provided with a special dovetailed formation, and upon forming the strip into a cylinder, the ends are dovetailed together preventing both axial and radial displacement. The cylinder so formed may then be machined without danger of displacement of the ends. If desired, the cylinder may be lined with soft bearing metal and split, preferably along the line of the seam, to produce half bearings.

While my invention is specifically applied to the making of bearings it will be obvious that my special dovetailed joint is of general utility in the joining together of metal sheets, and similar parts, whether in cylindrical form or otherwise. However, it is especially useful in the manufacture of bearings because it increases the ease and accuracy of machining and because, in the case of lined bearings, the dovetailed joint is a very tight one and prevents the escape of the lining metal which is introduced in molten condition.

Referring to the drawing.

Figure 2:
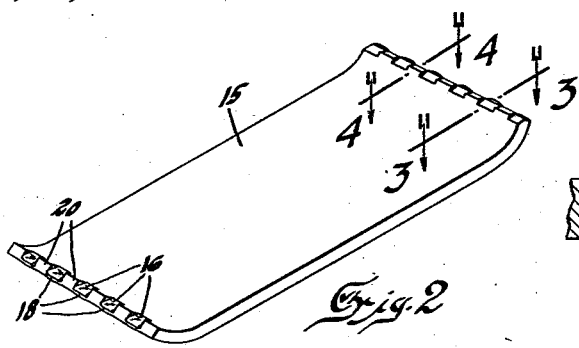
Figure 2 is a view of the blank with the ends slightly upturned and with dovetailed formation impressed.
Figure 3:
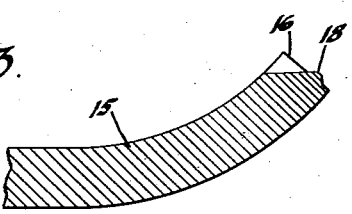
Figure 4:
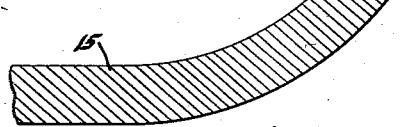

Figures 3 and 4 are enlarged sections on lines 3—3 and 4—4 of Figure 2.

Figure 5:
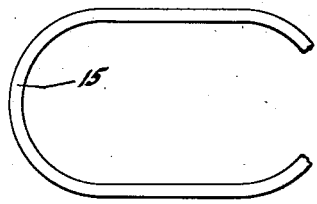

Figure 5 is a view of the blank after the next operation in which it is bent into partly elliptical form.

Figure 6:
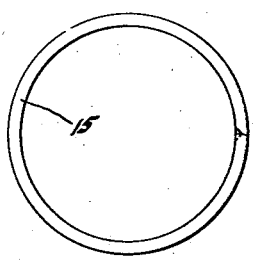
Figure 7:
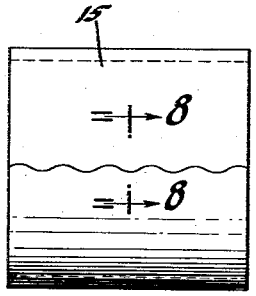

Figures 6 and 7 are views of the completed cylinder.

Figure 8:
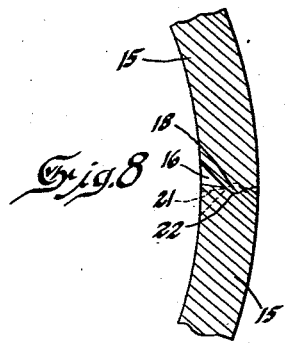

Figure 8 is an enlarged section on line 8—8 of Figure 7.

Figure 9:
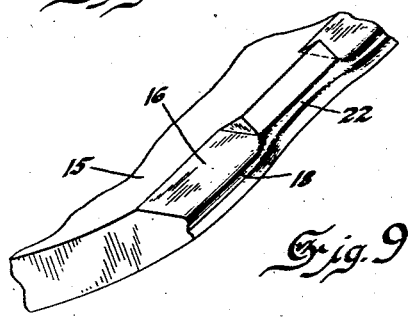

Figure 9 is a perspective view of one edge of the bearing shown in Figure 8.

Figure 10:

Figure 10 is an end view of a lined half bearing made by severing the blank of Figures 6 and 7.

Figure 1:
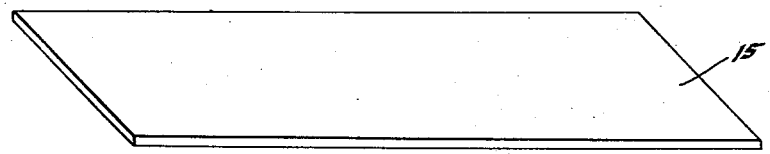
Figure 1 is a perspective view of a blank from which my bearing is made.

In Figure 1 I have shown at 15 a strip of sheet metal cut to shape for the formation of a bearing. This strip is put in a press and formed to the shape shown in Figure 2. In addition to giving the ends a slight radius to facilitate the final formation of a cylinder, the corners of the ends of the blank are pressed in, forming notches 16 and projections 18, clearly shown in Figure 3. The metal between the notches 16 is left in substantially its original flat condition as shown at 20. The next operation consists in forming the bearing to the shape shown in Figure 5, and then to the cylindrical form shown in Figures 6 and 7, this being done by means of dies. In the last operation the flat portions 20 are interlocked at their inner ends as indicated at 21, forming a dovetail joint and the projections 18 are forced against the flat portions 20, indenting them as is clearly shown at 22 in Figures 8 and 9, making an additional interlock. The pressure exerted in this operation deforms the metal and produces metal to metal contact all the way across the joint except, of course, at the notches 16.

In the manufacture of bearings the next steps are the conventional ones of trimming to length, boring and turning, and if lined bearings are desired, the interior must be tinned and babbitted prior to machining. After this is done, the cylinder may, if desired, be sawed along the line of the dovetailed joint to form half bearings such as illustrated in Figure 10. The sawing removes most of the joint. The half bearings may then, if desired, be reformed to smaller radius as is common in the manufacture of half bearings for automobile engines.

The joint prevents both radial and axial displacement of the ends of the cylinder, thereby facilitating machining and rendering it more accurate. Axial displacement of the ends of the blank is prevented by interlocking of the inner ends of the flat portions 20, while the interfitting projections 18 and grooves 22 resist both axial and radial displacement. It also is tight so that molten metal cannot leak out during the babbitting operation. Obviously the joint is easily and cheaply made and may be used to advantage in the joining together of other parts than the ends of cylinders.

I claim:

1. The method of forming a lock joint between the edges of metal sheets which consists in deforming the edges of the sheets to provide a series of projections alternating with flat portions, and forcing the edges of the sheets together so that the projections are forced against the flat portions of the adjacent edges of the sheets, forming sockets therein, and the edges are held against displacement.

2. The method of forming a lock joint between the edges of metal sheets, which consists in applying heavy pressure to a localized area at the side of a sheet adjacent one edge to cause the metal to flow out at the edge of the sheet forming a projection, and forcing the edges together so that the projection forms a socket for itself in the adjacent edge, holding the edges against displacement.

3. The method of forming a lock joint between the edges of metal sheets, which consists in applying heavy pressure to localized areas at the sides of the sheets adjacent an edge thereof to cause the metal to flow out at the edges, forming projections, and forcing the edges together so that the projections impinge against flat portions of the adjacent edges of the sheets, forming sockets therein, thereby holding the edges against displacement.

4. The method of forming a lock joint between the edges of metal sheets, which consists in applying heavy pressure to a localized area at the side of a sheet at the corner, thereby mashing down the corner to form a bevelled surface and a projection flowed out of the edge of the sheet, and forcing the edges together so that the projection forms a socket for itself in the adjacent edge, holding the edges against displacement.

5. The method of forming a lock joint between the edges of sheet metal cylinders, which consists in applying heavy pressure to localized areas at the sides of the sheets at the corner, thereby mashing down the corners to form bevelled surfaces and projections flowed out of the edges of the sheets, alternating with undistorted portions, and forcing the edges together to interlock the projections.

6. The method of forming a lock joint between the edges of metal sheets, which consists in applying heavy pressure to localized areas at the sides of the sheets at the corner, thereby mashing down the corners to form bevelled surfaces and projections flowed out of the edges of the sheets, alternating with undistorted portions, and forcing the edges together with the projections opposite undistorted portions, so that the projections form sockets for themselves in the undistorted portions of the adjacent edge, holding the edges against displacement.

7. A method of making bearings which comprises applying heavy pressure to localized areas at the side of a strip of sheet metal adjacent its ends to cause the metal to flow out at the end edges thereby forming projections, and bending the metal into cylindrical form, forcing the projections against flat portions of the adjacent edges of the sheets, forming sockets therein, the said projections and sockets holding the ends against radial and axial displacement.

8. A cylindrical bearing member formed of sheet metal bent into the form of cylinder, the meeting edges of each strip being provided at one corner only with a series of alternate notches and projections interlocked together to resist displacement of the edges.

9. The method of making a half bearing which consists in forming a series of projections on the end edges of a strip of metal, bending the strip into the form of a cylinder and forcing the edges together so that the projections form sockets for themselves in the edge of the strip against which they contact, thereby holding the ends of the strip against displacement, and thereafter severing the cylinder thus formed along a diameter passing through the said joint thus cutting away the locked section and making a smooth surface.

10. The method of forming a half bearing which consists in applying heavy pressure to localized areas at the corners of the end edges of a strip of metal thereby mashing down the corners to form beveled surfaces and projections flowed out of the ends of the strip alternating with undistorted portions, bending the strip into the form of a cylinder and forcing the edges together to interlock the projections, and thereafter severing the cylinder thus formed along a diameter passing through the said joint thus cutting away the locked section and making a smooth surface.

11. The method of forming a half bearing which consists in applying heavy pressure to localized areas at one corner of each of the ends of a strip of metal thereby mashing down the corners to form beveled surfaces and projections flowed out of the edges of the sheets alternating with undistorted portions, bending the strip into the form of a cylinder with the undistorted portions at one end interlocked with the undistorted portions at the other end to prevent lateral separation of the ends of the strip, and thereafter severing the cylinder thus formed along a diameter passing through the said joint thus cutting away the locked section and making a smooth surface.

12. An integral tubular member made of sheet metal having its edges meeting in a substantially longitudinal seam, one pair only of the opposed corners of said meeting edges being provided with a series of alternate notches and projections interlocked together to resist displacement of the edges, the abutting portions of said meeting edges being provided with interlocked projections and sockets.

13. A sheet metal tube having its edges meeting in a substantially longitudinal seam, one pair of opposed corners of said meeting edges being provided with projections in the form of triangular prisms, alternating with correspondingly shaped notches, said projections and notches being interlocked to resist displacement of the edges.

14. A sheet metal tube having its edges meeting in a substantially longitudinal seam, one pair of opposed corners of said meeting edges being provided with projections in the form of triangular prisms, alternating with correspondingly shaped notches, said projections and notches being interlocked to resist displacement of the edges, the remaining abutting portions of said meeting edges being provided with interfitting sockets and projections, the sockets lying adjacent the bases of said prisms.

In testimony whereof I affix my signature.

BENTON LARZELERE.